United States Patent [19]
Donaldson

[11] 3,881,748
[45] May 6, 1975

[54] ANTI LOAD STRIPPING ATTACHMENT FOR LOGGING TRUCK-TRAILER COMBINATIONS

[76] Inventor: Jack D. Donaldson, Rt. 4, Box 73, Chehalis, Wash. 98532

[22] Filed: July 26, 1973

[21] Appl. No.: 383,439

[52] U.S. Cl. ............... 280/404; 280/478 A; 188/67
[51] Int. Cl. ............................................ B62d 53/00
[58] Field of Search ............ 280/404, 478 R, 478 A, 280/478 B; 188/112, 129, 67

[56] References Cited
UNITED STATES PATENTS

| | | | |
|---|---|---|---|
| 1,700,532 | 1/1929 | Hunter | 188/67 |
| 2,614,864 | 10/1952 | Bean | 280/404 X |
| 2,716,560 | 8/1955 | Clipfell | 280/404 X |
| 2,984,319 | 5/1961 | Butler | 188/67 X |
| 3,140,881 | 7/1964 | Antici | 280/478 A |
| 3,232,636 | 2/1966 | Buchanan et al. | 280/404 |
| 3,521,908 | 7/1970 | Carter | 280/478 B X |
| 3,591,200 | 7/1971 | Van Raden | 280/404 X |

FOREIGN PATENTS OR APPLICATIONS
81,831  9/1956  Denmark ........................... 280/478

*Primary Examiner*—Robert B. Reeves
*Assistant Examiner*—Charles A. Marmor
*Attorney, Agent, or Firm*—Eugene D. Farley

[57] ABSTRACT

An attachment for logging truck-trailer combinations acts to prevent separation of the truck and trailer, and hence stripping of the load therefrom, under highway upgrade or mire conditions. The attachment comprises an elongated friction plate and a clamp positioned for releasable frictional engagement with the friction plate. A first connector connects the clamp to either the truck or the trailer reach. A second connector connects the friction plate to the other of the truck or trailer reach. Accordingly, under conditions tending to cause separation of the truck and trailer, the operator can apply the clamp sufficiently to prevent such separation.

4 Claims, 4 Drawing Figures

PATENTED MAY 6 1975 3,881,748

ANTI LOAD STRIPPING ATTACHMENT FOR LOGGING TRUCK-TRAILER COMBINATIONS

This invention relates to logging truck-trailer combinations. It pertains particularly to an anti load stripping attachment for preventing the separation of the truck and trailer, and consequent dumping of the load, under heavy travel conditions.

The conventional logging truck-trailer combination comprises truck and trailer units each including a bolster which pivotally mounts a transverse bunk. The trailer is provided with a reach or tongue of substantial length. The forward end of the reach is coupled pivotally and releasably to the rearward end of the truck frame.

Because of the character of the load, which consists of logs many feet in length supported at one end on the forward bunk and at the other end on the rearward bunk, a peculiar operational problem is encountered. If the trailer reach is pivotally coupled in fixed relation to the truck frame, it is impossible to turn a corner with the truck-trailer combination. Because of the inflexible character and great length of the logs, turning the front wheels of the truck has no steering effect whatsoever. The forward driving momentum of the load continues to drive the truck forwardly even though the steering wheels are turned at an angle, with the front wheels skidding sideways along the road.

To overcome this problem it is conventional practice to equip the trailer reach with a compensator head. This consists of a shaft which extends into the end of the reach. The outer end of the shaft is latched to a fitting on the rearward end of the truck. When the truck tows the trailer in empty condition, the compensator shaft is pinned to the reach to form a towing connection.

However, when the truck tows the trailer in a loaded condition, the pin connection is removed. The pulling force of the truck then is transmitted to the trailer through the logs themselves, rather than through the trailer reach and its connection to the truck frame.

This leaves the compensator shaft freely slidable within the end of the reach so that relative longitudinal adjustment between these two members may be made as required to make possible steering of the truck around corners.

The use of the compensator head in this manner is a highly successful expedient in overcoming the above described problem. However, it is attended by one serious disadvantage.

When the trailer unit is subjected to a heavy drag, as it is when the trailer wheels are mired down in soft ground, or when the combination ascends a steep grade, the weight of the logs bearing on the bunks which support them is insufficient to maintain the connection between truck and trailer. As a consequence, the forward ends of the logs slip off the forward bunk and are dumped on the roadway. This is particularly true when short logs are being carried which overhang the forward bunk by but a few inches. The labor required to clear the road, re-couple the trailer to the truck, and reload the logs is self-evident.

It accordingly is the general purpose of the present invention to provide a means for overcoming this problem and to prevent separation of the trailer from the truck in a logging truck-trailer combination under conditions of heavy load drag.

Other objects of the present invention are the provision of an anti load stripping attachment for logging truck-trailer combinations which is simple in construction, effective in operation, universally applicable to logging truck-trailer combinations of various design, relatively maintenance free, and not subject to damage by contact with limbs and knots.

Still a further object of the present invention is the provision of an anti load stripping attachment for logging truck-trailer combinations which is positive and safe in its use, and which is well adapted for operation from a remote station, specifically from the cab of the truck.

Broadly stated, the anti load stripping attachment for logging truck-trailer combinations which accomplishes the foregoing and other objects comprises an elongated friction plate with associated clamp means positioned for releasable, frictional clamping engagement with the friction plate. First connecting means connects the clamp means to either the truck or the trailer. Second connecting means connects the friction plate to the other one of the truck or trailer. Remote control means for the clamp means enables operation thereof from a remote station, such as the truck operator's cab.

As a consequence, during normal operation of the truck in log-loaded condition, the compensator head with which it is provided may function in conventional manner. However, under heavy load conditions which might cause a separation of the trailer from the truck, and dumping of the load of logs, the operator can apply the clamp means to the friction plate thereby preventing such separation. The clamping pressure then may be released after the problem area has been traversed.

Considering the foregoing in greater detail and with particular reference to the drawings wherein.

Figure 1:
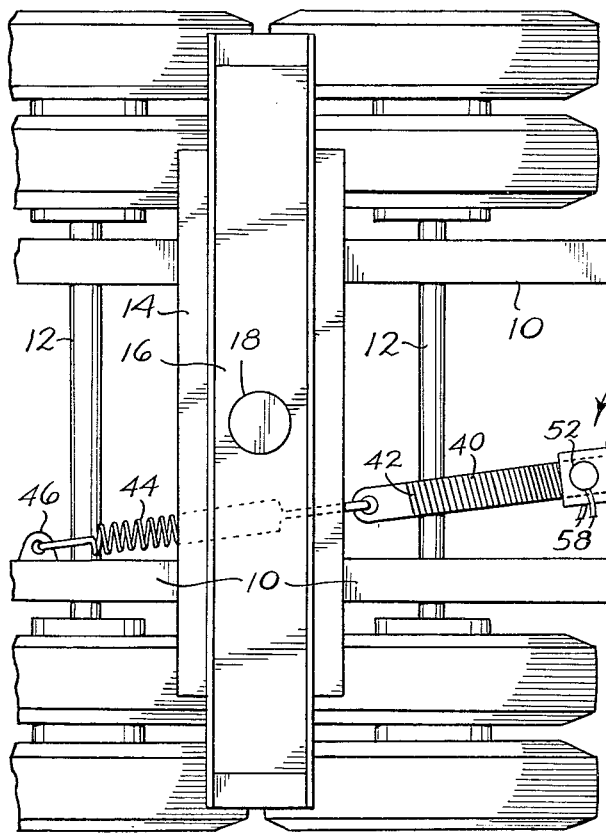
FIG. 1 is a fragmentary plan view of a logging truck-trailer combination provided with the anti load stripping attachment of my invention in a first embodiment.

The device of the present invention is designed for use on a conventional logging truck-trailer combination illustrated fragmentarily and schematically in FIG. 1.

The combination includes a conventional truck having in the usual manner a horizontal frame 10 supported on wheel-axle assemblies 12. The frame in turn supports a bolster 14 on which pivotally is mounted a log bunk 16 by means of a pivot 18.

A conventional trailer unit is coupled to the truck. In the drawings the reach or tongue only of the trailer is illustrated and indicated by the numeral 20. A log bunk not illustrated but similar in construction and function to log bunk 16 of the truck is mounted transversely of the trailer.

The reach normally comprises a hollow box frame open at its leading end. The leading end of the reach is coupled to the rearward portion or "stinger" of the truck frame by means of a latch 22 on the latter which engages an eye 24 on the former.

The connection of trailer to truck is made through the agency of the above noted compensator head which has for its function coupling the truck to the trailer through a towing connection when the combination is unloaded, but permitting longitudinal relative movement of the truck and trailer when the combination is loaded and the trailer is towed through the coupling effect of the logs themselves.

Figure 3:
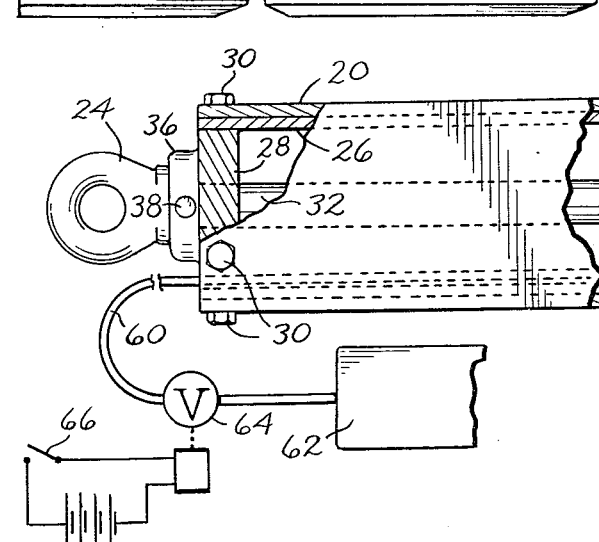
FIG. 3 is a fragmentary plan view of the end of a logging truck-trailer reach mounting the anti load stripping attachment of my invention in a second embodiment, partly in section.
Figure 4:
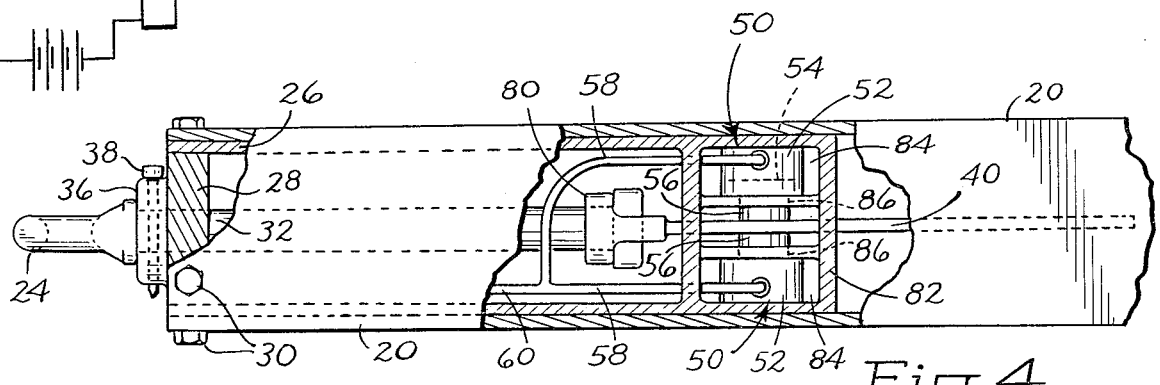
FIG. 4 is a fragmentary view in side elevation, partly in section, further illustrating the application of the second embodiment of my invention.

The construction of the compensator head is illustrated particularly in FIGS. 3 and 4.

It includes a box-shaped frame or case 26 and integral head piece 28 which are dimensioned and proportioned for insertion as a unit within the hollow outer end of reach 20, to which they are bolted by means of bolts 30.

A compensator shaft 32 is mounted for sliding longitudinal movement in a transverse opening centrally located through head piece 28. The outer end of compensator bar 32 mounts eye 24 by means of which the trailer is latched to the truck.

Means are provided for releasably connecting the compensator shaft to head piece 28, and accordingly to reach 20.

To this end a boss 36 having a central opening therethrough is integrated with outer surface of head piece 28. The central opening of the boss registers with the opening through the head piece and receives compensator shaft 32. A substantial pin 38 removably penetrates registering openings through the boss and through the shaft.

When the pin is in place, a towing connection is present between truck and trailer. When the pin is removed, as it is when the combination is loaded with logs, limited relative longitudinal movement of truck and trailer is permitted, as required to make possible steering the assembly.

It is the function of the anti load stripping device of my invention to provide a releasable connection between truck and trailer which at the will of the operator functions to prevent inadvertent separation of the units and dumping of the load of logs when the loaded unit ascends a steep hill, or traverses soft terrain.

Figure 2:
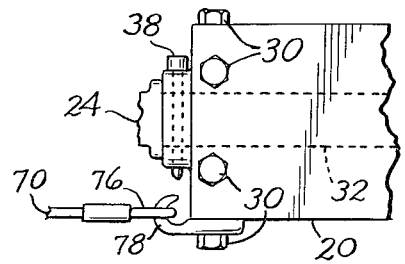
FIG. 2 is a fragmentary detail view in side elevation looking in the direction of the arrows of line 2—2 of FIG. 1.

In the embodiment of the invention illustrated in FIGS. 1 and 2, the attachment is mounted on the truck; in that of FIGS. 3 and 4, it is mounted within the trailer reach. Considering first the former:

The hereindescribed anti load stripping device includes as a principal component an elongated friction plate or bar 40. The plate is of substantial length and fabricated from structural metal of substantial strength. Its upper and lower surfaces preferably are marked with parallel transverse friction scores or grooves 42 to provide friction surfaces. Its forward end preferably is connected by means of a coil spring 44 or other resiliently extendable member to a tab 46 integral with truck frame 10. The spring has for its function maintaining the friction plate in proper operative relation to the releasable clamp by means of which it is connected to the frame of the truck.

Although various types of releasable clamp means or brake means may be employed for the intended purpose, a preferred type is the air cylinder type brake illustrated in detail in FIGS. 3 and 4.

As illustrated, the clamp means broadly comprises a conventional compressed air operated, diaphragm type pneumatic cylinder 50 mounted on a support plate 51 integral with frame 10. The cylinder includes a case 52, a rubber or other elastic diaphragm 54 stretched across the case, and a stub piston rod 56 which extends outwardly from the case and bears against the surface of friction plate 40. Preferably, the bearing surface of the piston rod is scored or grooved with depressions and elevations matching the scores or grooves 40 of the friction plate surface.

Preferably there are a pair of air cylinder assemblies 50 disposed in tandem relation to each other on opposite sides of the friction plate. The cylinders are supplied with air under pressure through conduits 58 which merge into a conduit 60. The latter communicates with a source of air under pressure i.e., tank 62.

The flow of air under pressure to the cylinders is controlled by a solenoid operated valve 64 operated by means of a switch 66 placed conveniently to the operator in the cab of the truck. Alternatively, the valving means may comprise an air valve, not illustrated, but similarly situated in a location convenient to the truck operator.

Second connecting means also are provided for connecting the friction plate to the trailer.

In the embodiment of FIGS. 1 and 2, the second connecting means comprises a stout flexible cable 70 connected to the end of friction plate 40 through a swivel 72. The latter member has for its function preventing kinking of the cable during working of the unit.

Cable 70 passes through a guide 74 in the forward plate of frame 10. Its rearward end is fitted with an eye 76, FIG. 2, which releasably engages a hook 78 secured by means of one of bolts 30 to the reach of the trailer.

The form of the invention illustrated in FIGS. 3 and 4 is similar, except that the friction plate is mounted in the trailer reach, rather than on the truck.

To this end plate 40 is connected through a swivel 80 to the inner end of compensator shaft 32 as a longitudinal extension thereof. It is supported in bearing relation by the slotted side walls of a box shaped frame or case 82. The latter is formed as an integral extension of box frame 26 which houses the compensator head assembly. The box frame construction defines a pair of chambers 84 each of which houses one of air clamp cylinders 50, one above and one below friction plate 40.

To this end the cylinders are positioned with their piston rods 56 extending through guide openings 86 in cross plate components of frame extension 82.

OPERATION

In the operation of both forms of the invention the truck and trailer are moved to the log loading site, customarily with the trailer separated from the truck and riding piggy-back on the same. At the logging site the trailer is unloaded from the truck and coupled to the latter by engaging latch 22 on the truck frame stinger with eye 24 of compensator shaft 32, which is a component of the compensator head assembly housed within the forward end of trailer reach 20. The logs then are loaded on bunks 16, one bunk on the truck and one bunk on the trailer, bridging between these two units of the combination.

After the logs have been loaded, pin 38 is removed from the head of compensator shaft 32. This leaves the shaft freely slidable within its support bearings. The towing force then is transferred to the trailer through the logs which bridge and couple the truck and trailer.

The necessary adjustment of position between truck and trailer can be made as the combination negotiates highway curves.

In the event that a difficult situation is presented which might result in separation of the truck and trailer, dragging the logs off the forward bunk and dumping them on the ground, as might occur on a steep grade or on soft terrain which mires the trailer wheels, the hereindescribed clamping attachment is employed.

In both embodiments of the invention the operator actuates air clamp cylinders 50. These exert clamping pressure on opposite sides of friction plate 40 so that relative movement of the friction plate and air clamping cylinders is inhibited.

A temporary connection or coupling between truck and trailer thus is obtained. In the embodiment of FIGS. 1 and 2, the connection is obtained via truck frame 10, bracket 51, clamp cylinders 50, friction plate 40, cable 70, and trailer hook 78 which is fastened to the trailer reach.

In the embodiment of FIGS. 3 and 4 the connection is made via truck frame 10, latch 22, compensator shaft 32, friction plate 40, air clamping cylinders 50, case 26, and bolts 30 which bolt the case to trailer reach 20.

In both cases relative longitudinal movement of the truck and trailer is prevented, as is stripping of the logs from the truck.

After the danger area has been passed, air clamping cylinders 50 are deenergized so that the compensator head continues to make the necessary adjustments enabling proper steering of the truck-trailer combination.

Having thus described my invention in preferred embodiments, I claim:

1. In an anti-load stripping logging truck-trailer unit, the combination of:
   a. a truck frame,
   b. a hollow trailer reach,
   c. a compensator shaft mounted for longitudinal sliding movement in the trailer reach,
   d. releasable compensator shaft lock means engaging the compensator shaft for releasably locking it against longitudinal sliding movement,
   e. latch means releasably interconnecting the truck frame and compensator shaft,
   f. elongated friction plate means,
   g. friction plate mounting means mounting the friction plate means on the truck frame, longitudinally thereof,
   h. friction clamp means mounted on the truck frame for releasable frictional clamping engagement with the friction plate means,
   i. clamp means control means connected to the clamp means and operable from a remote station, and
   j. link means linking the friction plate means to the trailer reach.

2. The combination of claim 1 wherein the friction clamp means comprises a pair of compressed air actuated, resilient diaphragm mounted plungers positioned one on each side of the friction plate means in bearing engagement therewith, wherein the clamp means control means comprises electrically operated valve means arranged for valving compressed air to the plungers, and wherein the link means comprises cable means interconnecting the rearward end of the friction plate means and the forward end of the trailer reach.

3. In an anti-load stripping logging truck-trailer unit the combination of:
   a. a truck frame,
   b. a hollow trailer reach,
   c. a compensator shaft mounted for longitudinal sliding movement in the trailer reach,
   d. releasable compensator shaft lock means engaging the compensator shaft for releasably locking it against longitudinal sliding movement,
   e. latch means releasably interconnecting the truck frame and the compensator shaft,
   f. a case mounted entirely within the forward end of the trailer reach and receiving the compensator shaft,
   g. securing means securing the case to the trailer reach,
   h. elongated friction plate means attached to the compensator shaft as a rearward longitudinal extension thereof,
   i. friction clamp means mounted in the case and positioned for releasable frictional clamping engagement with the friction plate means, and
   j. clamp control means connected to the clamp means and operable from a remote station.

4. The combination of claim 3 wherien the friction clamp means comprises at least one fluid operated cylinder having a friction head in bearing engagement with the friction plate means and wherein the clamp means control means comprises electrically operated fluid control valve means for the fluid operated cylinder.

* * * * *